US011863288B2

(12) United States Patent
Laddu et al.

(10) Patent No.: US 11,863,288 B2
(45) Date of Patent: Jan. 2, 2024

(54) RELAYING TRANSMISSIONS

(71) Applicant: NOKIA TECHNOLOGIES OY, Espoo (FI)

(72) Inventors: Keeth Saliya Jayasinghe Laddu, Espoo (FI); Laddu Praneeth Jayasinghe, Piliyandala (LK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/792,791

(22) PCT Filed: Nov. 4, 2020

(86) PCT No.: PCT/EP2020/080880
§ 371 (c)(1),
(2) Date: Jul. 14, 2022

(87) PCT Pub. No.: WO2021/144048
PCT Pub. Date: Jul. 22, 2021

(65) Prior Publication Data
US 2023/0040312 A1 Feb. 9, 2023

(30) Foreign Application Priority Data

Jan. 16, 2020 (FI) ...................................... 20205039

(51) Int. Cl.
*H04B 7/155* (2006.01)
(52) U.S. Cl.
CPC ................ *H04B 7/15557* (2013.01)
(58) Field of Classification Search
None
See application file for complete search history.

(56) References Cited

U.S. PATENT DOCUMENTS

| 10,271,273 | B2 * | 4/2019 | Cohen ...................... H04B 7/14 |
| 2011/0273999 | A1 * | 11/2011 | Nagaraja ............... H04L 1/1692 |
| | | | 370/252 |
| 2017/0318525 | A1 | 11/2017 | Cohen |
| 2019/0280761 | A1 | 9/2019 | Hu et al. |
| 2019/0319774 | A1 * | 10/2019 | Luo ...................... H04W 40/246 |

OTHER PUBLICATIONS

International Search Report and Written Opinion dated Jan. 28, 2021 corresponding to International Patent Application No. PCT/EP2020/080880.

* cited by examiner

*Primary Examiner* — Shripal K Khajuria
(74) *Attorney, Agent, or Firm* — SQUIRE PATTON BOGGS (US) LLP (57) ABSTRACT

To meet different latency requirements a solution for a system having one or more apparatuses using a first type of relaying or a second type of relaying, the first type requiring more processing time at an apparatus than the second type, is disclosed. In the solution a type of relaying for a child apparatus is determined at least based on one or more of a latency requirement and feedback information on channel; and transmissions to or from child apparatuses are scheduled at least according to a determined type of relaying, wherein transmissions using the first type of relaying are scheduled to take place in the time domain of a transmission slot after transmissions using the second type of relaying; and transmissions to or from the child apparatus are processed according to the determined type of relaying.

9 Claims, 4 Drawing Sheets

RELAYING TRANSMISSIONS

TECHNICAL FIELD

Various example embodiments relate to wireless communications and, particularly, relaying transmissions by a relaying apparatus.

BACKGROUND

Wireless communication systems are under constant development. For example, to allow network deployment with minimized manual efforts and as automated self-configuration as possible, a solution called Integrated Access and Backhaul (IAB) has been introduced for nodes providing cells, the nodes having a wireless connection to network without any fixed connection. IAB nodes are configured to support concatenated relaying in which a backhaul may be carried from an IAB node to another IAB node until the last IAB node, which is serving access user apparatuses. This means that an IAB node may provide a shared backhaul to access user apparatuses and/or to one or more IAB nodes.

BRIEF DESCRIPTION

The scope of protection sought for various embodiments of the invention is set out by the independent claims. The embodiments, examples and features, if any, described in this specification that do not fall under the scope of the independent claims are to be Interpreted as examples useful for understanding various embodiments of the invention.

An aspect provides an apparatus comprising at least one processor; and at least one memory including computer program code; the at least one memory and the computer program code configured to, with the at least one processor, to cause the apparatus at least to perform: performing relaying using a first type of relaying or a second type of relaying, the first type requiring more processing time at the apparatus than the second type; determining the type of relaying for a child apparatus at least based on one or more of a latency requirement and feedback information on a channel; scheduling transmissions to or from child apparatuses at least according to a determined type of relaying, wherein transmissions using the first type of relaying are scheduled to take place in the time domain of a transmission slot after transmissions using the second type of relaying; and processing transmissions to or from the child apparatus according to the determined type of relaying.

In an embodiment the at least one memory and the computer program code configured to, with the at least one processor, further cause the apparatus at least to perform: transmitting in feedback to a parent apparatus information indicating the scheduling of transmissions to or from the child apparatuses in the apparatus.

In an embodiment, based on the previous embodiment, the information indicating the scheduling of transmissions comprises one or more of information on child apparatuses according to preferred order, information indicating which child apparatuses are requested to be scheduled to the beginning part or end part of a slot, information indicating the apparatus's capability of supporting first type and/or second type of relaying per child apparatus, information comprising feedback of child apparatuses on channel quality, long term statistics of channel quality and/or long term statistics of success rate of transmissions of the type of relaying used per child apparatus, performance and latency experienced in transmissions.

In an embodiment, based on the aspect, or in an embodiment, based on any of the previous embodiments, the at least one memory and the computer program code configured to, with the at least one processor, further cause the apparatus at least to perform: in response to receiving from a child apparatus in feedback information indication of scheduling transmissions in the child apparatus, updating scheduling in the apparatus.

In an embodiment, based on the aspect, or in an embodiment, based on any of the previous embodiments, the at least one memory and the computer program code configured to, with the at least one processor, further cause the apparatus at least to perform: checking, in certain time intervals, whether quality requirements for the transmission is met; performing, in response to the quality requirements not being met, re-determining the type of relaying and rescheduling.

In an embodiment, based on the aspect, or in an embodiment, based on any of the previous embodiments, the at least one memory and the computer program code configured to, with the at least one processor, further cause the apparatus at least to perform: monitoring, whether quality requirements are met; and performing, in response to the quality requirements not being met re-determining the type of relaying and rescheduling.

In an embodiment, based on the aspect, or in an embodiment, based on any of the previous embodiments, the at least one memory and the computer program code configured to, with the at least one processor, further cause the apparatus at least to perform: monitoring performance of the apparatus; and performing, in response to a problem in the performance, re-determining the type of relaying and rescheduling.

In an embodiment, based on the aspect, or in an embodiment, based on any of the previous embodiments, the first type of relaying comprises decoding received transmission to a data to be relayed, re-encoding the data to a regenerated transmission and forwarding the regenerated transmission and the second type of relaying comprises amplifying received transmission and forwarding amplified transmission.

In an embodiment, based on the aspect, or in an embodiment, based on any of the previous embodiments, the apparatus is an integrated access and backhaul node, and the child apparatus is another integrated access and backhaul node or an access user device.

According to another aspect, there is provided a method comprising: performing relaying using a first type of relaying or a second type of relaying, the first type requiring more processing time at the apparatus than the second type; determining the type of relaying for a child apparatus at least based on one or more of a latency requirement and feedback information on a channel; scheduling transmissions to or from child apparatuses at least according to a determined type of relaying, wherein transmissions using the first type of relaying are scheduled to take place in the time domain of a transmission slot after transmissions using the second type of relaying; and processing transmissions to or from the child apparatus according to the determined type of relaying.

In an embodiment, based on the above aspect, the method further comprises transmitting in feedback to a parent apparatus information indicating the scheduling of transmissions to or from the child apparatuses in the apparatus.

In an embodiment, based on the previous embodiment, the information indicating the scheduling of transmissions comprises one or more of information on child apparatuses according to preferred order, information indicating which child apparatuses are requested to be scheduled to the beginning part or end part of a slot, information indicating the apparatus's capability of supporting first type and/or second type of relaying per child apparatus, information comprising feedback of child apparatuses on channel quality, long term statistics of channel quality and/or long term statistics of success rate of transmissions of the type of relaying used per child apparatus, performance and latency experienced in transmissions.

In an embodiment, based on the aspect, or in an embodiment, based on any of the previous embodiments, the method further comprises, in response to receiving from a child apparatus in feedback information indication of scheduling transmissions in the child apparatus, updating scheduling in the apparatus.

According to a further aspect there is provided a non-transitory computer-readable storage medium storing instructions, which when executed by at least one processor, cause an apparatus to: perform relaying using a first type of relaying or a second type of relaying, the first type requiring more processing time at the apparatus than the second type; determine the type of relaying for a child apparatus at least based on one or more of a latency requirement and feedback information on a channel; schedule transmissions to or from child apparatuses at least according to a determined type of relaying, wherein transmissions using the first type of relaying are scheduled to take place in the time domain of a transmission slot after transmissions using the second type of relaying; and process transmissions to or from the child apparatus according to the determined type of relaying.

According to a still further aspect there is provided a computer program adapted to perform: performing relaying using a first type of relaying or a second type of relaying, the first type requiring more processing time at the apparatus than the second type; determining the type of relaying for a child apparatus at least based on one or more of a latency requirement and feedback information on a channel; scheduling transmissions to or from child apparatuses at least according to a determined type of relaying, wherein transmissions using the first type of relaying are scheduled to take place in the time domain of a transmission slot after transmissions using the second type of relaying; and processing transmissions to or from the child apparatus according to the determined type of relaying.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
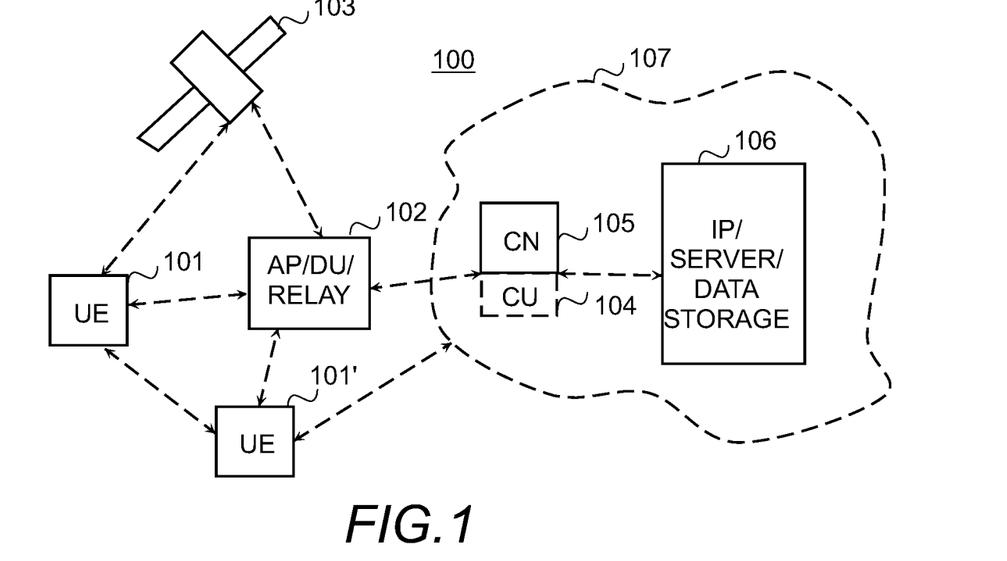
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be Implemented by using any node, host, server or access point (AP) etc. entity suitable for such usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having the capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of Interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications support a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and can also be integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB or a donor (e/g) NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been Introduced. Typically, a network which is able to use "plug-and-play" (e/g)Node Bs, includes, in addition to donor/Home (e/g) NodeBs (H(e/g)nodeBs), a home/donor node B gateway, or HNB-GW (not shown in FIG. 1). A HNB Gateway (HNB-GW), which is typically installed within an operator's network may aggregate traffic from a large number of HNBs back to a core network.

Figure 2:
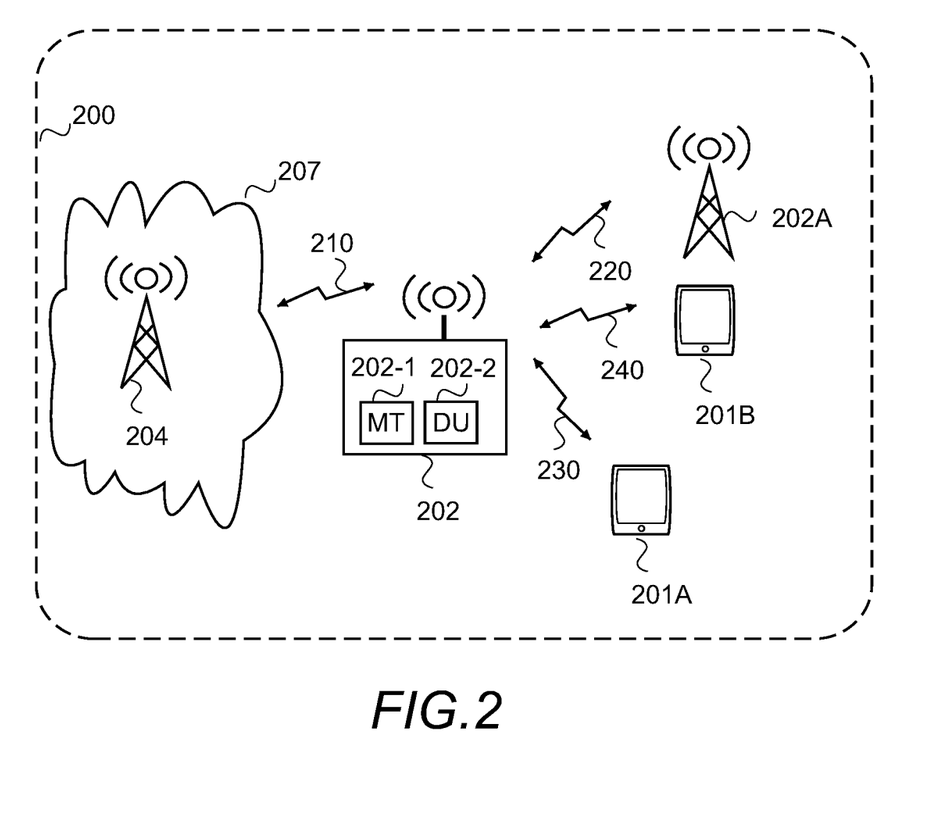
FIG. 2 illustrates an example architecture of an integrated backhaul and access.

FIG. 2 illustrates a simplified example of a wireless system 200, which is configured to provide integrated access and backhaul via relay nodes (relay apparatuses), which may be also called IAB nodes. In the integrated access and backhaul, the backhaul can be carried over multiple hops from one relay node (IAB node) to another relay node (IAB node) until the last relay node serving an access user device. A node (apparatus) wherefrom a relay node receives a transmission is called a parent node and a node whereto the transmission is relayed is called a child node. It should be appreciated that FIG. 2 only shows some apparatuses to illustrate the integrated access and backhaul system. It is apparent to a person skilled in the art that the systems also comprise other equipment, functional entities and apparatuses.

Referring to FIG. 2, the illustrated system 200 comprises a network 207 to which an access node 204 has a fixed connection (not shown in FIG. 2), two relay nodes 202, 202A and two user devices 201A, 201B. It should be appreciated that each of the nodes 204, 202, 202A may serve user devices. Below the relay nodes are called IAB nodes, without limiting the solutions to IAB nodes. It should be appreciated that term "IAB node" covers any relaying apparatus configured/configurable to perform a corresponding functionality.

The access node 204 having the fixed connection to the network 207 may be called a donor node. The access node 204 (the donor node) may host the centralized unit (not illustrated in FIG. 2) for the IAB nodes 202, 202A, and a distributed unit. The centralized unit may be configured to run radio resource control (RRC), higher layer 2 (L2), such as a packet data convergence protocol (PDCP) sublayer above a radio link control (RLC) sublayer, and control functions for the subtending IAB topology. The distributed unit in the donor node may be configured to run lower layer 2 protocol layers, which are the radio link control sublayer and a medium access control sublayer below the radio link control sublayer, and a physical layer (PHY) below the layer 2.

An IAB node 202, 202A may comprise a distributed unit (DU) 202-2 (illustrated in FIG. 2 in the node 202) and a mobile termination unit (MT) 202-1 (illustrated in FIG. 2 in the node 202). The distributed unit (DU) 202-2 in the IAB node is similar to the distributed unit in the donor node. In other words, the distributed unit (DU) 202-2 may be configured to run lower layer 2 protocol layers, which are the radio link control sublayer and a medium access control sublayer below the radio link control sublayer, and a physical layer (PHY) below the layer 2. The mobile termination unit (MT) 202-1 is configured to act towards a distributed unit of the parent node. Hence, the mobile termination unit (MT) 202-1 may be configured to run lower layer 2 protocol layers, which are the radio link control sublayer and a medium access control sublayer below the radio link control sublayer, and a physical layer (PHY) below the layer 2. Basically, the mobile termination unit (MTI) 202-1 transmits/receives transmissions from a parent node, and the distributed unit transmits/receives transmissions from child IAB nodes and access user devices (served user devices).

The centralized unit may have two control interfaces (not illustrated in FIG. 2) to the relay nodes (IAB nodes), one to the mobile termination unit and another to the distributed unit.

In the illustrated example of FIG. 2, the IAB node 202 has as its parent node the access node (donor node) 204, and as its children the access user devices 201A, 201B and the IAB node 202A, which may be called a child node.

The IAB node 202A has the IAB node 202 as its parent node, but no children are illustrated in FIG. 2.

The communication link 210 provides a downlink parent backhaul and uplink parent backhaul to the IAB node 202. For example, the downlink parent backhaul link in the link 210 will carry both physical downlink control channel (PDCCH) and physical downlink shared channel (PDSCH) transmissions towards the mobile termination unit 202-1 in the IAB node 202. Correspondingly, the uplink parent backhaul link in the link 210 will carry both physical uplink control channel (PUCCH) and physical uplink shared channel (PUSCH) transmissions from the mobile termination unit 202-1 in the IAB node 202. The communication link 220 provides downlink child backhaul and uplink parent backhaul to the IAB node 202. The communication links 230, 240 provide uplink access and downlink access. The communication links are supported in different time resources. In the examples it is assumed, for the sake of clarity, that the communication link 210 and communication links 220,230, 240 are orthogonal in time resources. For example, a first slot may be for the communication link 210 and the next slot (second slot) for one of the communication links 220, 230, 240, or for two or more of the communication links 220, 230, 240 if multiplexing in time is used. It should be appreciated that if MIMO antennas and/or a software defined monitoring (SDM) based schemes are applied, the links may not be orthogonal in the time resources.

Herein a term "child apparatus" is used as a synonym of an access user device and the child IAB node (relay node, relaying apparatus), i.e. to cover both types of children, and term "parent apparatus" as a synonym to the parent node.

Below different examples are described assuming that two different ways of relaying are used, without limiting the examples to such a solution. The relaying ways are called below using term "type of relaying", a synonym to the type being a mode (relaying mode, mode of relaying). It should be appreciated that the below illustrated principles can be implemented when three or more different types of relaying are used, the implementation being a straightforward task for one skilled in the art. Further, for the sake of clarity, in the below examples it is assumed one transmission per one child apparatus, without limiting the examples to such a solution. It should be appreciated that there may be several transmission to one child apparatus, each of which may be treated as one transmission per one child apparatus.

An IAB node (relay node), below simply node, or any corresponding apparatus, may be configured to implement one or more of functionalities described with FIGS. 3 to 8 and a donor node, or any corresponding apparatus, may be configured to implement the functionality described with FIG. 8. It should be appreciated that the relaying node may implement also upper layer protocols and corresponding functionality, when relaying transmissions, even though in the system example in FIG. 2, described above, it is assumed that only lower layer protocols and functionality is implemented in the IAB node.

Figure 3:
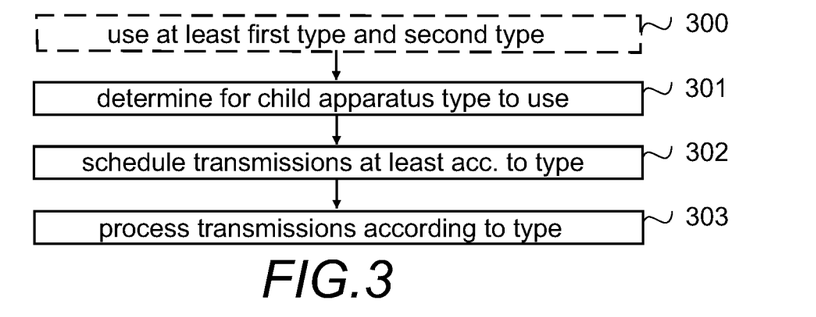
FIGS. 3 to 8 are flow charts illustrating different examples of functionalities.

Referring to FIG. 3, the node is using (block 300) at least a first type of relaying and second type of relaying to support latency requirements, which may differ, for a set of child apparatuses using same shared resources. The different types of relaying differ at least on the time required by the node to process received transmissions before forwarding the transmissions. The types may also require different processing capacity. In the below examples it is assumed that the first type requires more time and more processing capacity than the second type.

The node determines in block 301 for a child apparatus, which is in a connected state, a type of relaying to use. The type may be determined using one or more of the following comprising load of processing capability in the IAB node, latency requirements for data transmissions, and feedback information on a channel. The feedback information on the channel may be information on long term statistics of channel quality, long term statistics of success rate of transmissions, for example statistics relating to hybrid automatic repeat request (HARQ), and short term information, for example one or more latest channel quality feedbacks. Different examples of determining, and re-determining the type of relaying are described in more detail below with FIGS. 5 and 6. It should be appreciated that any other principles to determine the type of relaying may be used. The node schedules in block 302 transmissions to/from children according to the determined type. For example, transmissions to child apparatuses having the first type as the determined type may be scheduled in a time domain of a slot to the end part of the slot. Correspondingly, transmissions to child apparatuses having the second type as the determined type may be scheduled in the time domain of the slot to the beginning part of the slot.

The node also processes in block 303 transmissions to/from a child apparatus according to the determined type of relaying of the child apparatus, the processing including relaying (forwarding, transmitting) the transmission using the resources allocated during scheduling.

Figure 4:
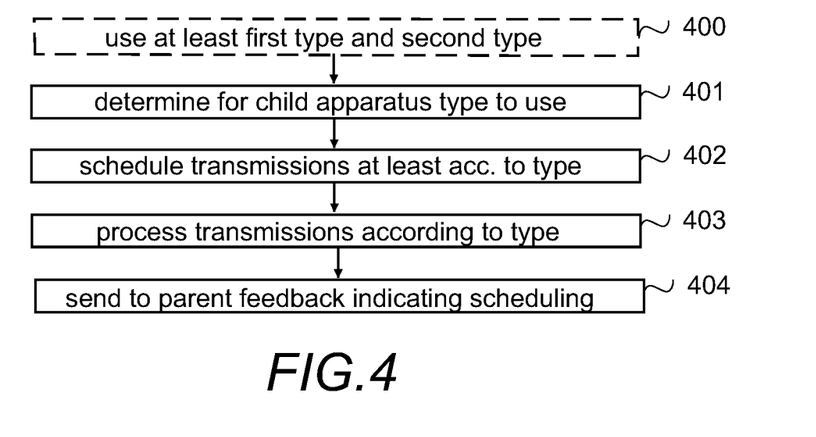

Referring to FIG. 4, the process starts as described above with FIG. 3, and blocks 400 to 403 corresponding to blocks 300 to 303, correspondingly, and they are not described in detail. Therefore the blocks are not repeated in vain herein. The example in FIG. 4 differs from the example illustrated in FIG. 3 in that respect that the IAB node transmits in block 404 in its feedback to its parent apparatus information indicating the scheduling the IAB node is using. In other words, existing feedback mechanisms are enhanced to contain said information. The information may be a scheduling suggestion, for example a request to send transmissions to child apparatuses that are determined to be the first type in the beginning part of a slot, and transmissions to child apparatuses that are determined to be the second type in the end part of the slot. This may be indicated, for example, by sending information on child apparatuses according to preferred order, or information indicating that these child apparatuses are requested to be scheduled to the beginning part/end part. Another example includes indicating the IAB node's capability of supporting first type/second type of relaying per child apparatus. For example, one of the types, or both, may require a special hardware to be able to support the type of relaying. Further, not every child apparatus, for example, support both types of relaying, or due to channel conditions, only the first type can be used. Still further examples include the feedback information comprising feedback of child apparatuses on channel quality, long term statistics of channel quality and/or long term statistics of success rate of transmissions of the type of relaying used per child apparatus, performance and latency experienced (with the used type of relaying) in transmissions towards child apparatuses. For example, if the channel quality is poor whilst the latency is critical for a child apparatus, it indicates that the child apparatus should be scheduled to the beginning part. In another example, it may be that for all child apparatuses at first the first type of relaying is used, but if the backhaul link gets congested, the channel qualities of child apparatuses may be used to determine child apparatuses for the second type of relaying. Naturally the feedback (feedback information) may comprise any combination of the above examples to provide the parent apparatus with information indicating directly or indirectly the scheduling the IAB node uses. In other words, the purpose is to indicate, directly or Indirectly, to the parent apparatus for which child apparatuses the first type of relaying should be used and for which child apparatuses the second type of relaying can be used. The parent apparatus may take the feedback information into account when the parent apparatus schedules transmissions.

Figure 5:
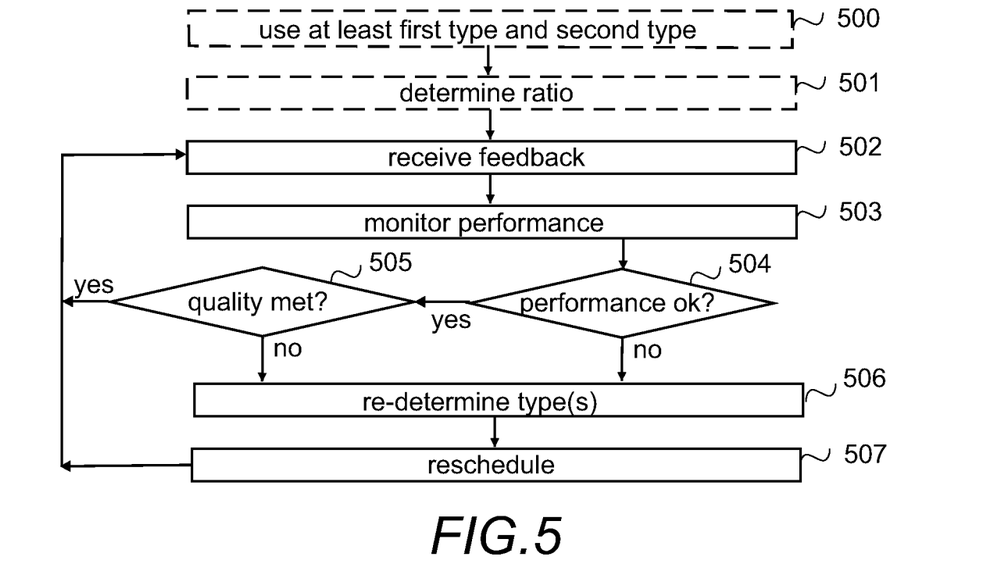

FIG. 5 illustrates an example of how the IAB node may be configured to perform determining and re-determining the type of relaying, for example when performing block 301/401 (and re-performing block 302/402).

Referring to FIG. 5, the node is using (block 500) at least the first type of relaying and the second type of relaying. In the illustrated example, as a preliminary measure, a ratio between the two types is determined in block 501. The ratio may be determined, for example, using the following: assuming that the processing capacity required by a transmission using the first type is $c_x$, and the processing capacity required by a transmission using the second type is $c_y$, and the total capacity is c, the following equation has to be fulfilled: $c=N*c_x+M*c_y$, wherein N and M are integers, having values starting from 0, N being the number of child apparatuses for which the first type is used and M the number of child apparatuses for which the second type is used. Further, the processing capacity (performance) of the IAB node may be taken into account when the ratio is determined. The processing capacity may limit the number of child apparatuses having the first type of relaying to a maximum number of N. The determined ratio may be used, together with the other information, to determine the type to be used in block 301/401.

Regardless whether or not the ratio is determined, i.e. whether block 501 is performed or not, once the type for a child apparatus is determined and transmission scheduled, the IAB node receives in block 502 feedback on transmissions from child apparatuses and monitors in block 503 the performance of the IAB node. The performance may be monitored by monitoring load of the processing capability in the IAB node and/or are transmissions forwarded at the first possible scheduled resource or in the next possible resource. The feedback on transmissions may indicate how latency requirements for data transmissions are fulfilled. The feedback may also (in addition to, or instead of, depending on implementation) indicate long term and/or short term statistics of success rate of transmissions, for example statistics relating to hybrid automatic repeat request (HARQ). If there are no problems with the performance (block 504: yes), i.e. there is no overload or overflow, and the required quality is met (block 505: yes), the process continues the receiving feedback and monitoring performance.

If there is a problem/problems with the performance (block 504: no), for example there is an overload of capacity and/or overflow of transmission, types to be used for relaying are re-determined in block 506 for child apparatuses, and transmissions rescheduled in block 507 to reflect the re-determined types. Then the process continues the receiving feedback and monitoring performance. The re-determining types of relaying may comprise changing a type of one child apparatus, with the best feedback and/or with latency requirement allowing longest latency, for example, from the first type to the second type.

If the quality is not met (block 505: no), for example the latency requirement is not fulfilled, the process may re-determine in block 506 the type of relaying, based on the feedback information indicating the cause and transmissions are rescheduled in block 507 to reflect the re-determined type. For example, if the type is the first type and the feedback information indicates that latency requirements are not met, the type may be determined to be the second type. In another example, if the type is the second type, and the feedback information indicates that retransmissions occur, the type may be re-determined to be the first type. However, to avoid ping-pong between types, if the type has been the first type, re-determined to the second type, and once again will be re-determined the first type, next time the re-determining is skipped. In such situations, and in situations in which re-determining the type actually results to the same type, transmissions are rescheduled in block 507 to reflect the result. For example, transmission may be scheduled to happen later (more at the end of the slot), if possible. Then the process continues the receiving feedback and monitoring performance.

Figure 6:
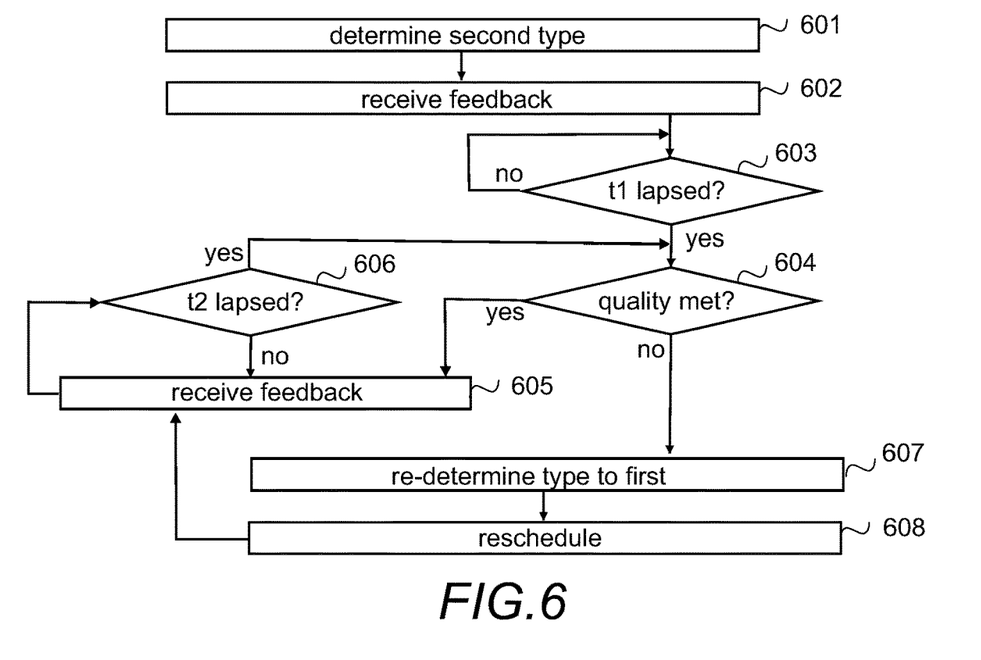

FIG. 6 illustrates another example how the IAB node may be configured to perform determining and re-determining the type of relaying in certain time intervals. For example, the IAB node may be configured to initially, as a default, to determine the type to be used to be the second type, or the process is used when, for example when performing block 301/401 (and re-performing block 302/402) results to the type of relaying being the second type.

Referring to FIG. 6, when the type to be used has been determined in block 601 to be the second type, and receiving in block 602 feedback from child apparatus is continued until time t1 has lapsed. The time t1 may be a short time, especially if, when the determination of the type is made, there are no long term statistic on feedback available. After the time t1 has lapsed, it is checked in block 603, whether the quality is met, based on the received feedback, as described above. If the quality is met (block 604: yes), the process continues in block 605 to receive feedback until time t2 has lapsed (block 606). Depending on the implementation, time t2 may be longer than time t1, or they are the same.

When the time t2 lapsed (block 606: yes), the process returns to block 603 to check, whether the quality is met.

If the quality is not met (block 603: no), in the illustrated example the type is re-determined in block 607 to be the first type, and transmissions are rescheduled in block 608 accordingly, and the process continues to block 605 to receive feedback. Naturally in block 607, performance may be taken into account, as described with FIG. 5.

It should be appreciated that time t2 may increase gradually each time it is detected that quality is met.

With the times t1 and t2 dynamicity of the scheduling may be adjusted. For example, if the IAB node uses capability information of the child apparatus, long term statistic on previous transmissions and the required latency and performance requirements to determine the type of relaying, the longer the time t1 and/or t2 may be. However, shorter time interval provides a more dynamic decision, also better taking into account possible changes in the channel quality.

In a further example, if the determined type of relaying is the first type, for example the first type is used as a default type, the example of FIG. 6 may be modified to check in block 604, whether there are problems with the performance, and if no, continue to block 605, otherwise to block 607 to re-determine the type to be the second type, if possible, as described above with FIG. 5.

The IAB node may be configured to implement redetermining based on both examples of FIG. 5 and FIG. 6, or based on one of them, and/or to implement redetermining using other principles. Further, it should be appreciated that in some implementations the IAB node may not perform any redetermining of types.

Figure 7:
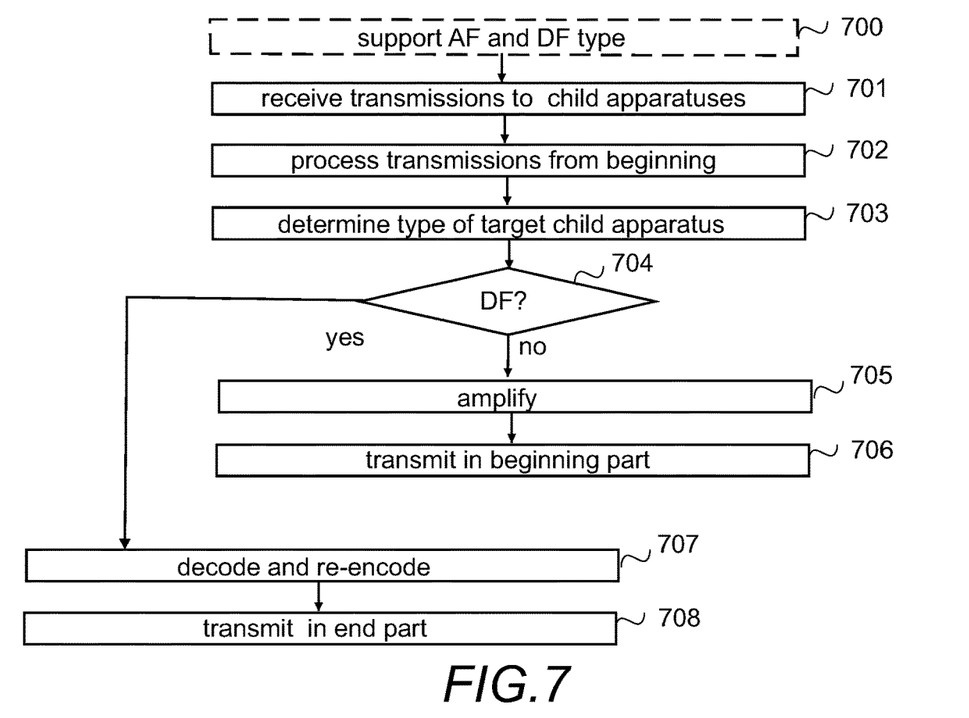

FIG. 7 illustrates an example of a processing functionality of transmissions in an IAB node when the IAB node relays transmissions to the child apparatuses. In the example it is assumed that the first type of relaying is decode and forward (DF) and the second type of relaying is amplify and forward (AF). It should be appreciated that they are used only for illustrative purposes, and similar principles may be applied for other types of relaying. Further, the principles disclosed may be used also for transmissions from the child apparatuses to the parent apparatus. Also it should be noted that the amplify and forward relaying process takes place in the physical layer, whereas the decode and forward relaying process may take place in addition to the physical layer, also in the medium access control sublayer, and possibly also in the radio link control sublayer.

Referring to FIG. 7, the IAB node is configured (block 700) to support both the decode and forward type of relaying and the amplify and forward type of relaying. When transmissions to child apparatuses are received in block 701 in one slot, transmissions are processed in block 702 starting in the time domain in the beginning of the slot.

For a transmission, the type of the relaying determined for the target child apparatus is determined in block 703. If the type is not the decode and forward (block 704: no), the transmission is amplified in block 705 and transmitted in block 706 in the beginning part in the time domain of the transmission slot (as scheduled). If the type is the decode and forward (block 704: yes), the transmission is decoded in block 707 to data to be relayed, and the data to be relayed is then re-encoded in block 707 to a transmission, and transmitted in block 708 in the end part in the time domain of the transmission slot (as scheduled).

Combining any of the re-determining of the type to be used with the example of FIG. 7, it is possible to take into account that when the type "amplify and forward" is used, also noise is amplified, which may in some channel conditions decrease the quality too low. Then the change of the type to "decode and forward" may mitigate the noise enhancement in the IAB node. Further, it is possible to take into account that when the type "decode and forward" is used, the processing time may be too long to fulfill the latency requirements, and the change of the type to "amplify and forward" may help to achieve the latency requirements.

Figure 8:
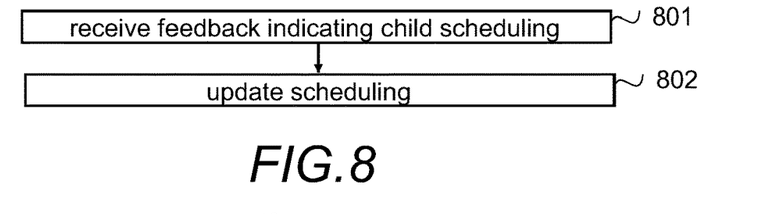

FIG. 8 illustrates an example of a functionality of the IAB node in implementations in which child apparatuses (child IAB nodes) are configured to send to the parent apparatus in the feedback to the parent apparatus the information indicating the scheduling the child IAB node is using. Corresponding functionality may be performed by the donor node as well.

Referring to FIG. 8, when information indicating the scheduling the child IAB node is using is received in block 801, scheduling of transmissions is updated in block 802. It should be appreciated that when scheduling of transmissions is updated, also other factors, such as retransmission attempts, than the indicated scheduling may be taken into account. In any case, the parent apparatus remains in control of its traffic arrangements (scheduling).

Figure 9:
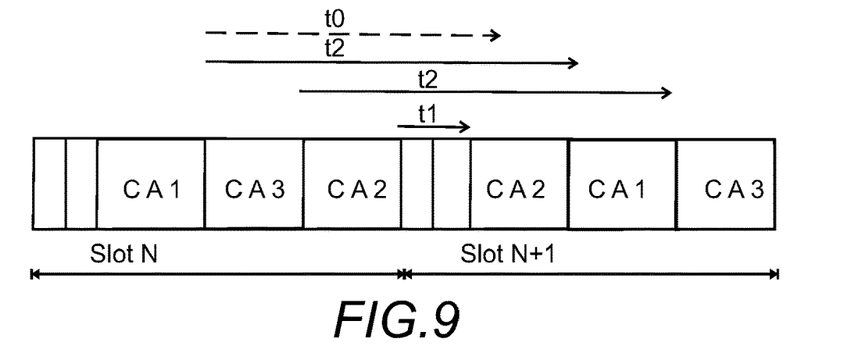
FIGS. 9 and 10 are examples of scheduling arrangements.
Figure 10:
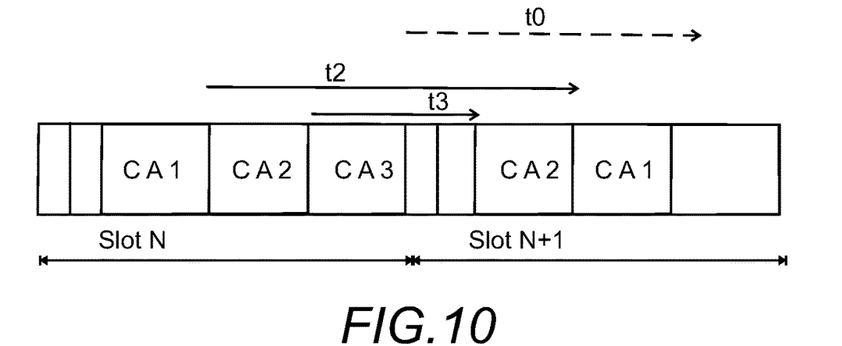

FIGS. 9 and 10 illustrate different examples of scheduling arrangements, wherein the slot N is used by the parent to transmit transmissions to the IAB node, and the slot N+1 is used by the IAB node to relay the transmissions. In the examples it is assumed that the IAB node has determined following types for child apparatuses: first type to CA1, second type to CA2 and first type to CA3, and transmissions are scheduled so that transmission to CA1 is scheduled to take place in the beginning of the slot, and transmissions to CA1 and CA3 in the end part. Further, the processing time required by the first type is t0, and the processing time required by the second type is t1 (or less).

Referring to FIG. 9, in the illustrated example it is assumed that the IAB node has sent as a scheduling suggestion to the parent node information indicating "transmit to CAL, CA3 in the beginning part of the slot and to CA2 in the end part", and that the parent apparatus followed the suggestion. As can be seen from FIG. 9, processing of the transmissions begins when they are received, and thanks to the scheduling taking into account the types, processing of the transmission CA2 gives enough time (time t2 is longer than time t0) to process the transmissions to CA1 and CA3 so that they can be sent at the first possible slot Hence, sending the scheduling suggestion and following it by each node in the hop enables to keep the end to end priorization of low latency child apparatuses (access user devices).

In the example of FIG. 10, it may be that the IAB node has not sent any scheduling suggestion to the parent apparatus or the parent apparatus is not following it Processing of the transmissions begins when they are received, and thanks to the scheduling in the IAB node taking into account the types, transmitting the transmission CA2 in the beginning part gives enough time (time t2 is longer than time t0) to process the transmissions to CAL. Since the transmission to CA3 is received later than the transmission to CA2, no additional time is provided by the scheduling arrangement to the transmission to CA3, and transmission will take place in the next slot for transmissions from the IAB node. However, should the IAB node followed the same scheduling as used by the parent apparatus, also transmission to CA1 would have taken place in the next slot. In other words, even this solution provides better support for different latency requirements.

As is evident from the above examples, the IAB node's processing capability can be efficiently used for latency reductions, and to facilitate end-to-end data transmission latency requirements. Further, good channel conditions may be taken into account by using transmissions of the second type of relaying, whenever appropriate. Further, the use of second type of relaying, when the quality is good enough, results in energy savings in the IAB node (less processing capacity used means less energy is used).

The blocks, related functions, and information exchanges described above by means of FIGS. 2 to 10 are in no absolute chronological order, and some of them may be performed simultaneously or in an order differing from the given one. Other functions can also be executed between them or within them, and other information may be transmitted, and/or other rules applied. Some of the blocks or part of the blocks or one or more pieces of information can also be left out or replaced by a corresponding block or part of the block or one or more pieces of information.

Figure 11:
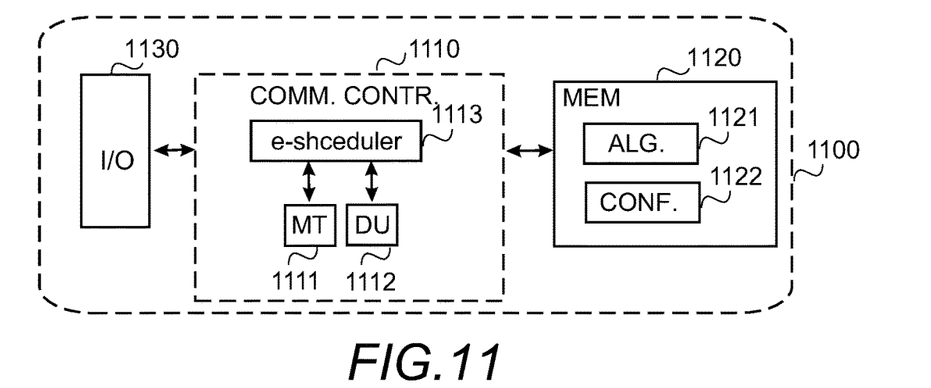
FIG. 11 is a block diagram of structures of an apparatus according to an example.

FIG. 11 illustrates an apparatus comprising a communication controller 1110 such as at least one processor or processing circuitry, and at least one memory 1120 including a computer program code (software, algorithm) ALG. 1121, wherein the at least one memory and the computer program code (software, algorithm) are configured, with the at least one processor, to cause the apparatus to carry out any one of the embodiments, examples and implementations described above. FIG. 11 illustrates an apparatus configured to act as a relaying apparatus, such as the IAB node. The apparatus of FIG. 11 may be an electronic device.

Referring to FIG. 11, the memory 1120 may be implemented using any suitable data storage technology, such as semiconductor based memory devices, flash memory, magnetic memory devices and systems, optical memory devices and systems, fixed memory and removable memory. The memory may comprise a configuration storage CONF. 1121, such as a configuration database, for at least storing one or more configurations and/or corresponding parameters/parameter values, or corresponding information, required for scheduling transmissions, including determining types of relaying to be used, and determined types to use. The memory 1120 may further store a data buffer for data waiting to be processed (including relaying).

Referring to FIG. 11, the apparatus 1100 may further comprise a communication interface 1130 comprising hardware and/or software for realizing communication connectivity according to one or more radio communication protocols. The communication interface 1130 may provide the apparatus with radio communication capabilities with one or more child apparatuses (child nodes, access user devices) served by the apparatus and with one or more donor apparatuses of a wireless network. The communication interface may comprise standard well-known analog radio components such as an amplifier, filter, frequency-converter and circuitries, conversion circuitries transforming signals between analog and digital domains, and one or more antennas. Digital signal processing regarding transmission and/or reception of signals may be performed in a communication controller 1110.

The communication controller 1110 comprises a mobile termination unit (MT) 1111 and a distributed unit (DU) 1112 configured to determine types of relaying, perform scheduling, and to relay transmissions according to any one of the embodiments/examples/implementations described above. The communication controller 1110 further comprises an enhanced scheduler unit (e-scheduler) 1113 configured to control co-operation of the mobile termination unit and the distributed unit to provide at least the first type of relaying and the second type of relaying in a coordinated way. Upon receiving resource request for data to/from the user device, a resource allocating circuitry RES 1112 may be triggered. The radio controller circuitry 1111 may communicate the reserved resources to the user device through the communication interface 1130.

The apparatus 1100 may further comprise an application processor (not illustrated in FIG. 11) executing one or more computer program applications that generate a need to transmit and/or receive data. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application.

In an embodiment, at least some of the functionalities of the apparatus of FIG. 11 may be shared between two physically separate devices, forming one operational entity. Therefore, the apparatus may be seen to depict the operational entity comprising one or more physically separate devices for executing at least some of the processes described with respect to the relaying apparatus.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 10 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments/examples/implementations of FIGS. 2 to 10, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are Intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An integrated access and backhaul (IAB) node or relay node, comprising
   at least one processor; and
   at least one memory including computer program code;
   the at least one memory and the computer program code configured to, with the at least one processor, to cause the IAB node or the relay node to perform:
   performing relaying using a first type of relaying or a second type of relaying, the first type requiring more processing time at the IAB node or the relay node than the second type;
   determining the type of relaying for a access user device or child IAB node at least based on one or more of a latency requirement for relaying data transmissions and feedback information on a channel to or from the access user device or the child IAB node;
   scheduling transmissions to or from the access user devices or the child IAB nodes at least according to a determined type of relaying, wherein transmissions using the first type of relaying are scheduled to take place in the time domain of a transmission slot after transmissions using the second type of relaying;
   transmitting in feedback to a parent node information indicating the scheduling of transmissions to or from the access user device or the child IAB node in the IAB node or the relay node, wherein the information indicating the scheduling of transmissions comprises information on accessing user devices or child IAB nodes according to a preferred order, or information indicating which access to the user devices or the child IAB nodes are requested to be scheduled to a beginning part or an end part of a slot, or information indicating the IAB node's or relay node's capability of supporting a first type and/or a second type of relaying per the access user device or the child IAB node, or information comprising feedback of the access user devices or the child IAB nodes on channel quality, or long term statistic of channel quality and/or long term statistics of success rate of transmissions of the type of relaying used per access user device or child IAB node, or performance and latency experienced in transmissions; and
   processing transmissions to or from the access user device or child IAB node according to the determined type of relaying.

2. The IAB node or the relay node of claim 1, wherein the at least one memory and the computer program code are configured to, with the at least one processor, further cause the IAB node or the relay node to perform:
   in response to receiving from the access user device or the child IAB node in feedback information indication of scheduling transmissions in the access user device or the child IAB node, updating scheduling in the IAB node or the relay node.

3. The IAB node or the relay node of claim 2, wherein the at least one memory and the computer program code are configured to, with the at least one processor, further cause the IAB node or the relay node to perform:
   checking, in certain time intervals, whether quality requirements for the transmission on a channel to or from the access user device or the child IAB node are met;
   performing, in response to the quality requirements not being met, re-determining the type of relaying and rescheduling.

4. The IAB node or the relay node of claim 2, wherein the at least one memory and the computer program code are configured to, with the at least one processor, further cause the IAB node or the relay node to perform:
   monitoring, whether quality requirements are met; and
   performing, in response to the quality requirements not being met re-determining the type of relaying and rescheduling.

5. The IAB node or the relay node of claim 1, wherein the at least one memory and the computer program code are configured to, with the at least one processor, further cause the IAB node or the relay node to perform:
   monitoring performance of the IAB node or the relay node; and
   performing, in response to a problem in the performance, re-determining the type of relaying and rescheduling.

6. The IAB node or the relay node of claim 1, wherein the first type of relaying comprises decoding received transmission to a data to be relayed, re-encoding the data to a regenerated transmission and forwarding the regenerated transmission and the second type of relaying comprises amplifying received transmission and forwarding amplified transmission.

7. A method, comprising:
   performing, by an integrated access and backhaul (IAB) node or relay node, relaying using a first type of relaying or a second type of relaying, the first type requiring more processing time at the IAB node or the relay node than the second type;
   determining the type of relaying for an access user device or child IAB node at least based on one or more of a latency requirement and feedback information on a channel;

scheduling transmissions to or from access user devices or child IAB nodes at least according to a determined type of relaying, wherein transmissions using the first type of relaying are scheduled to take place in the time domain of a transmission slot after transmissions using the second type of relaying; and transmitting in feedback to a parent node information indicating the scheduling of transmissions to or from the access user device or the child IAB node in the IAB node or the relay node, wherein the information indicating the scheduling of transmissions comprises information on accessing user devices or child IAB nodes according to a preferred order, or information indicating which access to the user devices or the child IAB nodes are requested to be scheduled to a beginning part or an end part of a slot, or information indicating the IAB node's or relay node's capability of supporting a first type and/or a second type of relaying per the access user device or the child IAB node, or information comprising feedback of the access user devices or the child IAB nodes on channel quality, or long term statistic of channel quality and/or long term statistics of success rate of transmissions of the type of relaying used per access user device or child IAB node, or performance and latency experienced in transmissions; and processing transmissions to or from the access user device or child IAB node according to the determined type of relaying.

8. The method of claim 7, further comprising:
in response to receiving from the access user device or the child IAB node in feedback information indication of scheduling transmissions in the access user device or the child IAB node, updating scheduling in the apparatus.

9. A non-transitory computer-readable medium comprising computer-readable code stored thereon which, when executed on an integrated access and backhaul (IAB) node or relay node, cause the IAB node or the relay node to perform:

relaying using a first type of relaying or a second type of relaying, the first type requiring more processing time at the IAB node or the relay node than the second type;

determining the type of relaying for an access user device or child IAB node at least based on one or more of a latency requirement and feedback information on a channel;

scheduling transmissions to or from access user devices or child IAB nodes at least according to a determined type of relaying, wherein transmissions using the first type of relaying are scheduled to take place in the time domain of a transmission slot after transmissions using the second type of relaying;

transmitting in feedback to a parent node information indicating the scheduling of transmissions to or from the access user device or the child IAB node in the IAB node or the relay node, wherein the information indicating the scheduling of transmissions comprises information on accessing user devices or child IAB nodes according to a preferred order, or information indicating which access to the user devices or the child IAB nodes are requested to be scheduled to a beginning part or an end part of a slot, or information indicating the IAB node's or relay node's capability of supporting a first type and/or a second type of relaying per the access user device or the child IAB node, or information comprising feedback of the access user devices or the child IAB nodes on channel quality, or long term statistic of channel quality and/or long term statistics of success rate of transmissions of the type of relaying used per access user device or child IAB node, or performance and latency experienced in transmissions; and processing transmissions to or from the access user device or child IAB node according to the determined type of relaying.

* * * * *